United States Patent
Nappa et al.

(10) Patent No.: US 9,446,270 B2
(45) Date of Patent: *Sep. 20, 2016

(54) FIRE EXTINGUISHING AND FIRE SUPPRESSION COMPOSITIONS COMPRISING UNSATURATED FLUOROCARBONS

(71) Applicant: CHEMOURS COMPANY FC LLC, Wilmington, DE (US)

(72) Inventors: Mario Joseph Nappa, Newark, DE (US); Ekaterina N Swearingen, Wilmington, DE (US); Allen Capron Sievert, Elkton, MD (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,841

(22) Filed: Oct. 15, 2012

(65) Prior Publication Data

US 2013/0037279 A1 Feb. 14, 2013

Related U.S. Application Data

(63) Continuation of application No. 11/590,453, filed on Oct. 31, 2006, now Pat. No. 8,287,752.

(60) Provisional application No. 60/732,396, filed on Nov. 1, 2005.

(51) Int. Cl.
*A62D 1/00* (2006.01)
*C09K 21/08* (2006.01)
*C09K 3/30* (2006.01)

(52) U.S. Cl.
CPC ............... *A62D 1/0057* (2013.01); *A62D 1/00* (2013.01); *A62D 1/005* (2013.01); *C09K 3/30* (2013.01); *C09K 21/08* (2013.01); *Y10T 137/0318* (2015.04)

(58) Field of Classification Search
CPC ... A62D 1/0028; A62D 1/0092; C09K 21/08
USPC .................... 252/2, 3, 8, 601, 605
See application file for complete search history.

(56) References Cited

U.S. PATENT DOCUMENTS

| | | | |
|---|---|---|---|
| 5,117,917 A | 6/1992 | Robin et al. | |
| 5,124,053 A | 6/1992 | Likubo et al. | |
| 5,463,150 A | 10/1995 | Lui et al. | |
| 5,759,430 A | 6/1998 | Tapscott et al. | |
| 5,900,185 A | * 5/1999 | Tapscott ........................... | 252/67 |
| 6,478,979 B1 | 11/2002 | Rivers et al. | |
| 2004/0119047 A1 | 6/2004 | Singh et al. | |
| 2006/0019857 A1 | 1/2006 | Wilson et al. | |
| 2008/0203349 A1 | 8/2008 | Singh et al. | |

FOREIGN PATENT DOCUMENTS

| | | | |
|---|---|---|---|
| JP | 03255039 A | * | 11/1991 |
| JP | 5042230 A | | 2/1993 |
| JP | 05042230 A | | 2/1993 |
| JP | 05179043 A | | 7/1993 |
| RU | 2071462 C1 | | 1/1997 |
| WO | 199707857 | | 3/1997 |
| WO | WO 2004067577 A2 | * | 8/2004 |

OTHER PUBLICATIONS

English abstract of Kitamura et al., JP 03255039 A (1991).*
Brown, HFOs New, Low Global Warming Potential Refrigerants, ASHRAE Journal, Aug. 2009.
Hexafluoropropylene, Material Safety Data Sheet, Specialty Gases of America, Inc. Dec. 18, 2009.
Octafluoro-2-Butene, Material Safety Data Sheet, Specialty Gases of America Inc., Nov. 23, 2009.
HFO-1234ze, BA-1, Safety Data Sheet, Honeywell, 2008.
PCT International Search Report for International Application No. PCT/US2006/042772 dated Apr. 16, 2007.
U.S. Appl. No. 11/589,588, filed Oct. 30, 2006, Inventors Sievert et al.
U.S. Appl. No. 60/732,396, filed Nov. 1, 2005—U.S. Appl. No. 11/590,543, filed Oct. 31, 2006, Inventors Nappa et al.
U.S. Appl. No. 60/732,771, filed Nov. 1, 2005—U.S. Appl. No. 11/591,650, filed Nov. 1, 2006, Inventors Nappa et al.
U.S. Appl. No. 60/732,909, filed Nov. 1, 2005—U.S. Appl. No. 11/591,350, filed Nov. 1, 2006, Inventors Creazzo et al.
Jeanneaux et al., Journal of Fluorine Chemistry, vol. 4 (1974), pp. 261-270 (Summary in English).
World Meterorological Organization: Scientific Assessment of Ozone Depletion: 2002, Global Ozone Research and Monitoring Project Report No. 47,498, pp. Geneva 2002.
Robin, "Halogenated Fire Suppression Agents", Halon Replacements: Technology and Science, Miziolek and Tsang, eds., ACS Symposium Series 611, American Chemical Society, Chap. 9, Washington, DC, Aug. 1994.
Gambaryan, et al., "Reactions of the Carbonyl Group in Fluorinated Ketones", Agnew. Chem. Internat. Edit., vol. 5, No. 11 (1966), pp. 947-982.
Lovelace et al., "Aliphatic Fluorine Compounds", American Chemical Society Monograph Series (1958), pp. 179-201.
Hirst et al., "Measurement of Flame-Extinguishing Concentrations", Fire Technology, vol. 13 (4) (1977), pp. 296-315.

* cited by examiner

Primary Examiner — Peter F Godenschwager

(57) ABSTRACT

Disclosed herein are flame suppression compounds and methods of use thereof. The compounds include unsaturated fluorocarbons appropriate for use in fire protection applications.

5 Claims, No Drawings

FIRE EXTINGUISHING AND FIRE SUPPRESSION COMPOSITIONS COMPRISING UNSATURATED FLUOROCARBONS

CROSS REFERENCE TO RELATED APPLICATIONS

This application claims priority to U.S. Application No. 60/732,396, incorporated herein by reference.

FIELD OF THE INVENTION

The disclosure herein relates to fire suppression compositions comprising fluorocarbons or hydrofluorocarbons. The disclosure herein further relates to use of the fire suppression compositions for flame suppression, reduction, extinguishment, or inertion.

BACKGROUND OF THE INVENTION

Numerous agents and methods of fire fighting are known and can be selected for a particular fire, depending upon factors such as its size, location and the type of combustible materials involved. Halogenated hydrocarbon fire fighting agents have traditionally been utilized in the fire protection industry, in applications including fire prevention applications, which leave a breathable atmosphere in an enclosed area, total flooding applications, wherein an enclosure is completely filled ("flooded") with an effective amount of the agent (e.g., computer rooms, storage vaults, telecommunications switching gear rooms, libraries, document archives, petroleum pipeline pumping stations, and the like), or in streaming applications wherein the agent is directed towards the location of the fire (e.g., commercial hand-held extinguishers). Such extinguishing agents are not only effective but, unlike water, also function as "clean extinguishing agents", causing little, if any, damage to the enclosure or its contents.

The most commonly-used halogenated hydrocarbon extinguishing agents have been the bromine-containing compounds bromotrifluoromethane ($CF_3Br$, Halon1301) and bromochlorodifluoromethane ($CF_2ClBr$, Halon1211). These bromine-containing halocarbons are highly effective in extinguishing fires and can be dispensed either from portable streaming equipment or from an automatic total flooding system activated either manually or by some method of fire detection. However, due to the presence of Br and Cl atoms within their molecular structure these compounds have been linked to the destruction of stratospheric ozone ("ozone depletion"). The Montreal Protocol and its attendant amendments have mandated that Halon1211 and 1301 production be discontinued. Thus, there is a need in this field for substitutes or replacements for the commonly-used, bromine-containing fire extinguishing agents. Such substitutes should have a low ozone depletion potential (ODP); should have the ability to efficiently extinguish, control, and prevent fires, e.g., Class A (trash, wood, or paper), Class B (flammable liquids or greases), and/or Class C (energized electrical equipment) fires; and should be "clean extinguishing agents", i.e., be electrically non-conducting, volatile or gaseous, and leave no residue following their use. Preferably, substitutes will also be low in toxicity, not form flammable mixtures in air, and have acceptable thermal and chemical stability for use in extinguishing applications. In addition, suitable Halon replacements should exhibit a minimum impact on climate change, i.e., they should not contribute significantly to global warming, being characterized by a low global warming potential (GWP).

Various different fluorinated hydrocarbons have been suggested for use as fire fighting agents, as described by M. L. Robin, "Halogenated Fire Suppression Agents", in *Halon Replacements: Technology and Science*, A. W. Miziolek and W. Tsang, eds., ACS Symposium Series 611, American Chemical Society, Washington, D.C., August 1994, Chapter 9. For example, hydrobromofluorocarbons (HBFCs) and hydrochlorofluoro-carbons (HCFCs) have been proposed as substitutes for the Halon agents. Although effective as fire extinguishing agents, and characterized by lower ODPs compared to the Halons, HBFCs and HCFCs still contribute to the destruction of stratospheric ozone, and as a result their use and production has been slated for phase out.

In U.S. Pat. No. 5,117,917 the use of perfluorocarbons (PFCs), for example perfluoro-n-butane, as fire extinguishing agents is disclosed. The PFCs are efficient fire extinguishing agents agents and do not contribute to the destruction of stratospheric ozone (i.e., their ODP is equal to zero). However, the extremely high chemical and thermal stability of the PFCs results in their being characterized by very long atmospheric lifetimes. As a result of their long atmospheric lifetimes and their ability to absorb infrared (IR) radiation, the PFCs strongly contribute to global warming, and are characterized by very high GWPs.

In U.S. Pat. No. 5,759,430 the use of bromine-containing olefins as fire extinguishing agents is disclosed. While some bromine-containing olefins, for example 2-bromo-3,3,3-trifluoropropene ($CF_3CBr=CH_2$) have been disclosed to exhibit fire extinguishing characteristics, others, for example bromotrifluoroethylene ($CF_2=CFBr$) have been reported to be flammable (Bromotrifluoroethylene MSDS, Air Liquide). The bromine-containing olefins are characterized by short atmospheric lifetimes and low GWP, but are also characterized by small, but non-zero ODPs. In addition, the relatively high toxicity of the bromo-olefins severely limits their applications.

In U.S. Pat. No. 5,124,053 the use of hydrofluorocarbons (HFCs) as fire extinguishing agents is disclosed. The HFCs are characterized by efficient fire suppression, zero ODP, low toxicity, and are also "clean" agents, leaving no residues following their use. The HFCs are, however, characterized by moderate GWPs and hence contribute somewhat to global warming.

In U.S. Pat. No. 6,478,979 the use of perfluorinated ketones as fire extinguishing agents is disclosed. These compounds are characterized by efficient fire suppression, zero ODP and low GWP. However, the perfluorinated ketones are also characterized by high chemical reactivity (cf. N. P. Gambarayan, et. al., *Angew. Chemie Intern. Ed.*, 5(11), 947 (1966); A. M. Lovelace, et. al., Aliphatic Fluorine Compounds, ACS Monograph Series, 1958, p. 180.). For example, the ketone $CF_3CF_2C(O)CF(CF_3)_2$ reacts with water to form the highly acidic, highlytoxic, and corrosive perfluoroacid perfluoropropionic acid, $CF_3CF_2COOH$, this hydrolysis reaction also occurring when the compound is absorbed across the lung/air interface.

SUMMARY OF THE INVENTION

One aspect provides a flame suppression composition comprising at least one fluorocarbon or hydrofluorocarbon selected from the group consisting of:

(i) a hydrofluorocarbon having the formula E- or Z-$R^1CH=CHR^2$, wherein $R^1$ and $R^2$ are, independently, $C_1$ to $C_6$ perfluoroalkyl groups; and (ii) a fluorocarbon or hydrofluorocarbon selected from the group consisting of $CF_3CH=CF_2$, $CHF_2CF=CF_2$, $CHF_2CH=CHF$, $CF_3CF=CH_2$, $CF_3CH=CHF$, $CH_2FCF=CF_2$, $CHF_2CH=CF_2$, $CHF_2CF=CHF$, $CHF_2CF=CH_2$, $CF_3CH=CH_2$, $CH_3CF=CF_2$, $CH_2FCHCF_2$, $CH_2FCF=CHF$, $CHF_2CH=CHF$, $CF_3CF=CFCF_3$, $CF_3CF_2CF=CF_2$, $CF_3CF=CHCF_3$, $CF_3CF_2CF=CH_2$, $CF_3CH=CHCF_3$, $CF_3CF_2CH=CH_2$, $CF_2=CHCF_2CF_3$, $CF_2=CFCHFCF_3$, $CF_2=CFCF_2CHF_2$, $CHF_2CH=CHCF_3$, $(CF_3)_2C=CHCF_3$, $CF_3CF=CHCF_2CF_3$, $CF_3CH=CFCF_2CF_3$, $CF_3CF=CFCF_2CF_3$, $(CF_3)_2CFCH=CH_2$, $CF_3CF_2CF_2CH=CH_2$, $CF_3(CF_2)_3CF=CF_2$, $CF_3CF_2CF=CFCF_3$, $(CF_3)_2C=C(CF_3)_2$, $(CF_3)_2CFCF=CHCF_3$, $CF_2=CFCF_2CH_2F$, $CF_2=CFCHFCHF_2$, $CH_2=C(CF_3)_2$, $CH_2CF_2CF=CF_2$, $CH_2FCF=CFCHF_2$, $CH_2FCF_2CF=CF_2$, $CF_2=C(CF_3)(CH_3)$, $CH_2=C(CHF_2)(CF_3)$, $CH_2=CHCF_2CHF_2$, $CF_2=C(CHF_2)(CH_3)$, $CHF=C(CF_3)(CH_3)$, $CH_2=C(CHF_2)_2$, $CF_3CF=CFCH_3$, $CH_3CF=CHCF_3$, $CF_2=CFCF_2CF_2CF_3$, $CHF=CFCF_2CF_2CF_3$, $CF_2=CHCF_2CF_2CF_3$, $CF_2=CFCF_2CF_2CHF_2$, $CHF_2CF=CFCF_2CF_3$, $CF_3CF=CFCF_2CHF_2$, $CF_3CF=CFCHFCF_3$, $CHF=CFCF(CF_3)_2$, $CF_2=CFCH(CF_3)_2$, $CF_3CH=C(CF_3)_2$, $CF_2=CHCF(CF_3)_2$, $CHF=CFCF_2CF_2CHF_2$, $CH_2=CFCF_2CF_2CF_3$, $CF_2=CHCH(CF_3)_2$, $CHF=CHCF(CF_3)_2$, $CF_2=C(CF_3)CH_2CF_3$, $CH_2=CFCF_2CF_2CHF_2$, $CF_2=CHCF_2CH_2CF_3$, $CF_3CF=C(CF_3)(CH_3)$, $CH_2=CFCH(CF_3)_2$, $CHF=CHCH(CF_3)_2$, $CH_2FCH=C(CF_3)_2$, $CH_3CF=C(CF_3)_2$, $CH_2=CHCF_2CHFCF_3$, $CH_2C(CF_3)CH_2CF_3$, $(CF_3)_2C=CHC_2F_5$, $(CF_3)_2CFCF=CHCF_3$, $CH_2=CHC(CF_3)_3$, $(CF_3)_2C=C(CH_3)(CF_3)$, $CH_2=CFCF_2CH(CF_3)_2$, $CF_3CF=C(CH_3)CF_2CF_3$, $CF_3CH=CHCH(CF_3)_2$, $CH_2=CHCF_2CF_2CHF_2$, $(CF_3)_2C=CHCF_2CH_3$, $CH_2=C(CF_3)CH_2C_2F_5$, $CH_2=CHCH_2CF_2C_2F_5$, $CH_2=CHCH_2CF_2C_2F_5$, $CF_3CF_2CF=CFC_2H_5$, $CH_2=CHCH_2CF(CF_3)_2$, $CF_3CF=CHCH(CF_3)(CH_3)$, $(CF_3)_2C=CFC_2H_5$, cyclo-$CF_2CF_2CF_2CH=CH-$, cyclo-$CF_2CF_2CH=CH-$, $CF_3CF_2CF_2C(CH_3)=CH_2$, $CF_3CF_2CF_2CH=CHCH_3$, cyclo-$CF_2CF_2CF=CF-$, cyclo-$CF_2CF=CFCF_2CF_2-$, cyclo-$CF_2CF=CFCF_2CF_2CF_2$, $CF_3CF_2CF_2CF_2CH=CH_2$, $CF_3CH=CHCF_2CF_3$, $CF_3CF_2CH=CHCF_2CF_3$, $CF_3CH=CHCF_2CF_2CF_3$, $CF_3CF=CFC_2F_5$, $CF_3CF=CFCF_2CF_2C_2F_5$, $CF_3CF_2CF=CFCF_2C_2F_5$, $CF_3CH=CFCF_2CF_2C_2F_5$, $CF_3CF=CHCF_2CF_2C_2F_5$, $CF_3CF_2CH=CFCF_2C_2F_5$, $CF_3CF_2CF=CHCF_2C_2F_5$, $C_2F_5CF_2CF=CHCH_3$, $C_2F_5CF=CHCH_3$, $(CF_3)_2C=CHCH_3$, $CF_3C(CH_3)=CHCF_3$, $CHF=CFC_2F_5$, $CHF_2CF=CFCF_3$, $(CF_3)_2C=CHF$, $CH_2FCF=CFCF_3$, $CHF=CHCF_2CF_3$, $CHF_2CH=CFCF_3$, $CHF=CFCHFCF_3$, $CF_3CH=CFCHF_2$, $CHF=CFCF_2CHF_2$, $CHF_2CF=CFCHF_2$, $CH_2CF=CFCF_3$, $CH_2FCH=CFCF_3$, $CH_2=CFCHFCF_3$, $CH_2=CFCF_2CHF_2$, $CF_3CH=CFCH_2F$, $CHF=CFCH_2CF_3$, $CHF=CHCF_2CHF_2$, $CHF=CHCF_2CHF_2$, $CHF_2CF=CHCHF_2$, $CHF=CFCHFCHF_2$, $CF_3CF=CHCH_3$, $CF_2=CHCF_2Br$, $CHF=CBrCHF_2$, $CHBr=CHCF_3$, $CF_3CBr=CFCF_3$, $CH_2=CBrCF_2CF_3$, $CHBr=CHCF_2CF_3$, $CH_2=CHCF_2CF_2Br$, $CH_2=CHCBrFCF_3$, $CH_3CBr=CHCF_3$, $CF_3CBr=CHCH_3$, $(CF_3)_2C=CHBr$, $CF_3CF=CBrCF_2CF_3$, E-$CHF_2CBr=CFC_2F_5$, Z-$CHF_2CBr=CFC_2F_5$, $CF_2=CBrCHFC_2F_5$, $(CF_3)_2CFCBr=CH_2$, $CHBr=CF(CF_2)_2CHF_2$, $CH_2=CBrCF_2C_2F_5$, $CF_2=C(CH_2Br)CF_3$, $CH_2=C(CBrF_2)CF_3$, $(CF_3)_2CHCH=CHBr$, $(CF_3)_2C=CHCH_2Br$, $CH_2=CHCF(CF_3)CBrF_2$, $CF_2=CHCF_2CH_2CBrF_2$, $CFBr=CHCF_3$, $CFBr=CFCF_3$, $CF_3CF_2CF_2CBr=CH_2$, and $CF_3(CF_2)_3CBr=CH_2$.

A further aspect provides for a method of reducing the flammability of a fluid comprising adding the flame suppression composition described above to the fluid.

Another aspect is for a method of suppressing a flame comprising contacting the flame with a fluid comprising the flame suppression composition described above.

One aspect is for a method of extinguishing or suppressing a fire in a total-flood application comprising:
(a) providing an agent comprising the flame suppression composition described above;
(b) disposing the agent in a pressurized discharge system; and
(c) discharging the agent into an area to extinguish or suppress fires in that area.

A further aspect is for a method of inerting an area to prevent a fire or explosion comprising:
(a) providing an agent comprising the flame suppression composition described above;
(b) disposing the agent in a pressurized discharge system; and
(c) discharging the agent into the area to prevent a fire or explosion from occurring.

Other objects and advantages will become apparent to those skilled in the art upon reference to the detailed description that hereinafter follows.

DETAILED DESCRIPTION OF THE INVENTION

Applicants specifically incorporate the entire content of all cited references in this disclosure. Applicants also incorporate by reference the co-owned and concurrently filed applications entitled "Solvent Compositions Comprising Unsaturated Fluorinated Hydrocarbons"(Attorney Docket #FL 1181 US PRV), "Blowing Agents for Forming Foam Comprising Unsaturated Fluorocarbons" (Attorney Docket #FL 1184 US PRV), "Aerosol Propellants Comprising Unsaturated Fluorocarbons" (Attorney Docket #FL 1185 US PRV), and "Compositions Comprising Fluoroolefins and Uses Thereof" (Attorney docket #FL 1159).

Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

One aspect provides compounds having the formula E- or Z-$R^1CH=CHR^2$ (Formula I), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_2CF_3$, $CF(CF_3)CF_2CF_2C_2F_5$, and $C(CF_3)_2CF_2C_2F_5$. Exemplary, non-limiting Formula I compounds are presented in Table 1.

TABLE 1

| Code | Structure | Chemical Name |
|---|---|---|
| F11E | $CF_3CH=CHCF_3$ | 1,1,1,4,4,4-hexafluorobut-2-ene |
| F12E | $CF_3CH=CHC_2F_5$ | 1,1,1,4,4,5,5,5-octafluoropent-2-ene |
| F13E | $CF_3CH=CHCF_2C_2F_5$ | 1,1,1,4,4,5,5,6,6,6-decafluorohex-2-ene |
| F13iE | $CF_3CH=CHCF(CF_3)_2$ | 1,1,1,4,5,5,5-heptafluoro-4-(trifluoromethyl)pent-2-ene |
| F22E | $C_2F_5CH=CHC_2F_5$ | 1,1,1,2,2,5,5,6,6,6-decafluorohex-3-ene |
| F14E | $CF_3CH=CH(CF_2)_3CF_3$ | 1,1,1,4,4,5,5,6,6,7,7,7-dodecafluorohept-2-ene |
| F14iE | $CF_3CH=CHCF_2CF-(CF_3)_2$ | 1,1,1,4,4,5,6,6,6-nonafluoro-5-(trifluoromethyl)hex-2-ene |
| F14sE | $CF_3CH=CHCF(CF_3)-C_2F_5$ | 1,1,1,4,5,5,6,6,6-nonafluoro-4-(trifluoromethyl)hex-2-ene |
| F14tE | $CF_3CH=CHC(CF_3)_3$ | 1,1,1,5,5,5-hexafluoro-4,4-bis(trifluoromethyl)pent-2-ene |
| F23E | $C_2F_5CH=CHCF_2C_2F_5$ | 1,1,1,2,2,5,5,6,6,7,7,7-dodecafluorohept-3-ene |
| F23iE | $C_2F_5CH=CHCF(CF_3)_2$ | 1,1,1,2,2,5,6,6,6-nonafluoro-5-(trifluoromethyl)hex-3-ene |
| F15E | $CF_3CH=CH(CF_2)_4CF_3$ | 1,1,1,4,4,5,5,6,6,7,7,8,8,8-tetradecafluorooct-2-ene |
| F15iE | $CF_3CH=CH-CF_2CF_2CF(CF_3)_2$ | 1,1,1,4,4,5,5,6,7,7,7-undecafluoro-6-(trifluoromethyl)hept-2-ene |
| F15tE | $CF_3CH=CH-C(CF_3)_2C_2F_5$ | 1,1,1,5,5,6,6,6-octafluoro-4,4-bis(trifluoromethyl)hex-2-ene |
| F24E | $C_2F_5CH=CH(CF_2)_3CF_3$ | 1,1,1,2,2,5,5,6,6,7,7,8,8,8-tetradecafluorooct-3-ene |
| F24iE | $C_2F_5CH=CHCF_2CF-(CF_3)_2$ | 1,1,1,2,2,5,5,6,7,7,7-undecafluoro-6-(trifluoromethyl)hept-3-ene |
| F24sE | $C_2F_5CH=CHCF(CF_3)-C_2F_5$ | 1,1,1,2,2,5,5,6,7,7,7-undecafluoro-5-(trifluoromethyl)hept-3-ene |
| F24tE | $C_2F_5CH=CHC(CF_3)_3$ | 1,1,1,2,2,6,6,6-octafluoro-5,5-bis(trifluoromethyl)hex-3-ene |

Compounds of Formula I may be prepared by contacting a perfluoroalkyl iodide of the formula $R^{1}I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at the reaction temperature. Suitable reaction vessels include those fabricated from stainless steels, in particular of the austenitic type, and the well-known high nickel alloys such as Monel® nickel-copper alloys, Hastelloy® nickel based alloys and Inconel® nickel-chromium alloys.

Alternatively, the reaction may be conducted in a semi-batch mode in which the perfluoroalkyltrihydroolefin reactant is added to the perfluoroalkyl iodide reactant by means of a suitable addition apparatus such as a pump.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et al. in Journal of Fluorine Chemistry, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide.

Said contacting of the trihydroiodoperfluoroalkane with a basic substance may take place in the liquid phase, preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point of the product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction vessel may be fabricated from glass, ceramic, or metal and is preferably agitated with an impellor or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, ethylene dichloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), and the cyclic ether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically the dehydroiodination reaction is rapid and requires about 30 minutes to about three hours for completion.

The compound of formula I may be recovered from the dehydroiodination reaction mixture by phase separation after addition of water, by distillation, or by a combination thereof.

The compositions of the present disclosure may comprise a single compound of Formula I, for example, one of the compounds in Table 1, or may comprise a combination of compounds of Formula I.

The compositions of the present disclosure may comprise a single compound as listed, for example, in Table 1, or may comprise a combination of compounds from Table 1. Additionally, many of the compounds in Table 1 may exist as different configurational isomers or stereoisomers. The present disclosure is intended to include all single configurational isomers, single stereoisomers, or any combination thereof. For instance, F11E ($CF_3CH=CHCF_3$) is meant to represent the E-isomer, Z-isomer, or any combination or mixture of both isomers in any ratio. Another example is F24E ($C_2F_5CH=CH(n-C_4F_9)$) by which is represented the E-isomer, Z-isomer, or any combination or mixture of both isomers in any ratio.

The present invention further relates to a method for replacing or substituting for the fire extinguishing agent having a GWP of about 150 or more, or a high GWP agent in a fire protection system, with a composition having a lower GWP. One method comprises providing a composition comprising at least one fluoroolefin of the present invention as the replacement. In another embodiment of the present invention, the agent having a lower GWP than the composition being replaced or substituted is used to suppress, extinguish or prevent a fire.

Global warming potentials (GWPs) are an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

A high GWP fire protection agent (extinguishing, suppressing, inerting or preventing) would be any compound capable of functioning as a agent and having a GWP at the 100 year time horizon of about 1000 or greater, alternatively 500 or greater, 150 or greater, 100 or greater, or 50 or greater. Fire protection agents that are in need of replacement, based upon GWP calculations published by the Intergovernmental Panel on Climate Change (IPCC), include but are not limited to HFC-227ea.

The present invention will provide compositions that have zero or low ozone depletion potential and low global warming potential (GWP). The fluoroolefins of the present invention or mixtures of fluoroolefins of this invention with other fire extinguishing compositions will have global warming potentials that are less than many hydrofluorocarbon fire protection agents currently in use. Typically, the fluoroolefins of the present invention are expected to have GWP of less than about 25. One aspect of the present invention is to provide an agent with a global warming potential of less than 1000, less than 500, less than 150, less than 100, or less than 50. Another aspect of the present invention is to reduce the net GWP of fire protection agents by adding fluoroolefins to said agents.

The present compositions also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

The compositions of the present disclosure may be prepared by any convenient method to combine the desired amounts of the individual components. A preferred method is to weigh the desired component amounts and thereafter combine the components in an appropriate vessel. Agitation may be used, if desired.

In a preferred embodiment, compounds of the present disclosure are useful in flame suppression, reduction, extinguishment, or inertion (collectively flame suppression compositions).

In addition to the inventive compounds described above, compounds presented in Table 2 can be used in flame suppression compositions.

TABLE 2

| Code | Structure | IUPAC Name |
| --- | --- | --- |
| FC-1318my | $CF_3CF=CFCF_3$ | 1,1,1,2,3,4,4,4-octafluorobut-2-ene |
| FC-1318cy | $CF_2=CFCF_2CF_3$ | 1,1,2,3,3,4,4,4-octafluorobut-1-ene |
| HFC-1327my | $CF_3CF=CHCF_3$ | 1,1,1,2,4,4,4-heptafluorobut-2-ene |
| HFC-1327cz | $CF_2=CHCF_2CF_3$ | 1,1,3,3,4,4,4-heptafluorobut-1-ene |
| HFC-1327ye | $CHF=CFC_2F_5$ | 1,2,3,3,4,4,4-heptafluoro-1-butene |
| HFC-1327py | $CHF_2CF=CFCF_3$ | 1,1,1,2,3,4,4-heptafluoro-2-butene |

TABLE 2-continued

| Code | Structure | IUPAC Name |
|---|---|---|
| HFC-1327cye | CF$_2$=CFCHFCF$_3$ | 1,1,2,3,4,4,4-heptafluorobut-1-ene |
| HFC-1327cyc | CF$_2$=CFCF$_2$CHF$_2$ | 1,1,2,3,4,4,4-heptafluorobut-1-ene |
| HFC-1327ey | CHF=CFCF$_2$CF$_3$ | 1,2,3,3,4,4,4-heptafluorobut-1-ene |
| HFC-1327ct | CF$_2$=C(CHF$_2$)CF$_3$ | 2-(difluoromethyl)-1,1,3,3,3-pentafluoroprop-1-ene |
| HFC-1327et | CHF=C(CF$_3$)$_2$ | 1,3,3,3-tetrafluoro-2-(trifluoromethyl)prop-1-ene |
| HFC-1336fy | CF$_3$CF$_2$CF=CH$_2$ | 2,3,3,3,4,5,5,5-octafluoropent-1-ene |
| HFC-1336qc | CF$_2$=CFCF2CH$_2$F | 1,1,2,3,3,4-hexafluorobut-1-ene |
| HFC-1336qy | CH$_2$FCF=CFCF$_3$ | 1,1,1,2,3,4-hexafluorobut-2-ene |
| HFC-1336ze | CHF=CHCF$_2$CF$_3$ | 1,3,3,4,4,4-hexafluorobut-1-ene |
| HFC-1336pz | CH$_2$FCH=CFCF$_3$ | 1,1,1,2,4-hexafluorobut-2-ene |
| HFC-1336pe | CH$_2$FCHFCF=CF$_2$ | 1,1,2,3,4,4-hexafluorobut-1-ene |
| HFC-1336eye | CHF=CFCHFCF$_3$ | 1,2,3,4,4,4-hexafluorobut-1-ene |
| HFC-1336ze | CHF=CHCF$_2$CF$_3$ | 1,3,3,4,4,4-hexafluoro-1-butene |
| HFC-1336pyy | CHF$_2$CF=CFCHF$_2$ | 1,1,2,3,4,4-hexafluoro-2-butene |
| HFC-1336mzy | CHF$_2$CF=CHCF$_3$ | 1,1,1,3,4,4-hexafluorobut-2-ene |
| HFC-1336czc | CHF$_2$CF$_2$CH=CF$_2$ | 1,1,3,3,4,4-hexafluorobut-1-ene |
| HFC-1336eyc | CHF=CFCF$_2$CHF$_2$ | 1,2,3,3,4,4-hexafluorobut-1-ene |
| HFC-1336cyf | CF$_2$=CFCH$_2$CF$_3$ | 1,1,2,4,4,4-hexafluorobut-1-ene |
| HFC-1336cze | CF$_2$=CHCHFCF$_3$ | 1,1,3,4,4,4-hexafluorobut-1-ene |
| HFC-1336ft | CH$_2$=C(CF$_3$)$_2$ | 3,3,3-trifluoro-2-(trifluoromethyl)prop-1-ene |
| HFC-1429mzt | (CF$_3$)$_2$C=CHCF$_3$ | 1,1,1,4,4,4-hexafluoro-2-(trifluoromethyl)but-2-ene |
| HFC-1429eyy | CHF=CFCF(CF$_3$)$_2$ | 1,2,3,4,4,4-hexafluoro-3-(trifluoromethyl)but-1-ene |
| HFC-1429cyz | CF$_2$=CFCH(CF$_3$)$_2$ | 1,1,2,4,4,4-hexafluoro-3-(trifluoromethyl)but-1-ene |
| HFC-1429czy | CF$_2$=CHCF(CF$_3$)$_2$ | 1,1,3,4,4,4-hexafluoro-3-(trifluoromethyl)but-1-ene |
| HFC-1429myz | CF$_3$CF=CHCF$_2$CF$_3$ | 1,1,1,2,4,4,5,5,5-nonafluoropent-2-ene |
| HFC-1429mzy | CF$_3$CH=CFCF$_2$CF$_3$ | 1,1,1,3,4,4,5,5,5-nonafluoropent-2-ene |
| HFC-1429eyc | CHF=CFCF$_2$CF$_2$CF$_3$ | 1,2,3,3,4,4,5,5,5-nonafluoropent-1-ene |
| HFC-1429czc | CF$_2$=CHCF$_2$CF$_2$CF$_3$ | 1,1,3,3,4,4,5,5,5-nonafluoropent-1-ene |
| HFC-1429cycc | CF$_2$=CFCF$_2$CF$_2$CHF$_2$ | 1,1,2,3,3,4,4,5,5-nonafluoropent-1-ene |
| HFC-1429pyy | CHF$_2$CF=CFCF$_2$CF$_3$ | 1,1,2,3,4,4,5,5,5-nonafluoropent-2-ene |
| HFC-1429myyc | CF$_3$CF=CFCF$_2$CHF$_2$ | 1,1,1,2,3,4,4,5,5-nonafluoropent-2-ene |
| HFC-1429myye | CF$_3$CF=CFCHFCF$_3$ | 1,1,1,2,3,4,5,5,5-nonafluoropent-2-ene |
| HFC-1438ezcc | CHF=CHCF$_2$CF$_2$CF$_3$ | 1,3,3,4,4,5,5,5-octafluoropent-1-ene |
| HFC-1438etme | CHF=C(CF$_3$)CHFCF$_3$ | 1,3,4,4,4-pentafluoro-2-(trifluoromethyl)but-1-ene |
| HFC-1438ftmc | CH$_2$=C(CF$_3$)CF$_2$CF$_3$ | 3,3,4,4,4-pentafluoro-2-(trifluoromethyl)but-1-ene |
| HFC-1438czz | CF$_2$=CHCH(CF$_3$)$_2$ | 1,1,4,4,4-pentafluoro-4-(trifluoromethyl)but-1-ene |
| HFC-1438ezy | CHF=CHCF(CF$_3$)$_2$ | 1,3,4,4,4-pentafluoro-4-(trifluoromethyl)but-1-ene |
| HFC-1438ctmf | CF$_2$=C(CF$_3$)CH$_2$CF$_3$ | 1,1,4,4,4-pentafluoro-2-(trifluoromethyl)but-1-ene |
| PFBE (HFC-1549fzcc) | CF$_3$CF$_2$CF$_2$CF$_2$CH=CH$_2$ | 3,3,4,4,5,5,6,6,6-nonafluorohex-1-ene |
| HFC-1549czcf | CF$_2$=CHCF$_2$CH$_2$CF$_2$CF$_3$ | 1,1,3,3,5,5,6,6,6-nonafluorohex-1-ene |
| HFC-1549myzf | CF$_3$CF=CHCH$_2$CF$_2$CF$_3$ | 1,1,1,2,5,5,6,6,6-nonafluorohex-2-ene |
| HFC-1549fzt | CH$_2$=CHC(CF$_3$)$_3$ | 4,4,4-trifluoro-3,3-bis(trifluoromethyl)but-1-ene |
| HFC-1549mmttm | (CF$_3$)$_2$C=C(CH$_3$)CF$_3$ | 1,1,1,4,4,4-hexafluoro-1-(trifluoromethyl)but-2-ene |
| HFC-1549ctmfe | CF$_2$=C(CF$_3$)CH$_2$CHFCF$_3$ | 1,1,4,5,5,5-hexafluoro-2-(trifluoromethyl)but-1-ene |
| HFC-1549ctsc | CF$_2$=C(CH$_3$)CF$_2$CF$_2$CF$_3$ | 1,1,3,3,4,4,5,5,5-nonafluoro-2-methylpent1-ene |
| HFC-1549etsf | CHF=C(CF$_3$)CH$_2$CF$_2$CF$_3$ | 1,4,4,5,5,5-hexafluoro-2-(trifluoromethyl)pent-1-ene |
| HFC-1549fzym | CH$_2$=CHCF(CF$_3$)CF$_2$CF$_3$ | 3,4,4,5,5,5-hexafluoro-3-(trifluoromethyl)pent-1-ene |
| HFC-1549fycz | CH$_2$=CFCF$_2$CH(CF$_3$)$_2$ | 2,3,3,5,5,5-hexafluoro-4-(trifluoromethyl)pent-1-ene |
| HFC-1549mytp | CF$_3$CF=C(CH$_3$)CF$_2$CF$_3$ | 1,1,1,2,4,4,5,5,5-nonafluoro-3-methylpent-2-ene |
| HFC-1549mzzz | CF$_3$CH=CHCH(CF$_3$)$_2$ | 1,1,1,5,5,5-hexafluoro-4-(trifluoromethyl)pent-2-ene |
| FC-141-10myy | CF$_3$CF=CFC$_2$F$_5$ | 1,1,1,2,3,4,4,5,5,5-decafluoro-2-pentene |
| HFC-152-11mmyyz | (CF$_3$)$_2$CFCF=CHCF$_3$ | 1,1,1,3,4,5,5,5-octafluoro-4-(trifluoromethyl)pent-2-ene |
| HFC-152-11mmtz | (CF$_3$)$_2$C=CHC$_2$F$_5$ | 1,1,1,4,4,5,5,5-octafluoro-2-(trifluoromethyl)-2-pentene |
| HFC-151-12myyc | CF$_3$CF=CFCF$_2$CF$_2$CF$_3$ | 1,1,1,2,3,4,4,5,5,6,6,6-dodecafluorohex-2-ene |
| HFC-151-12ctmc | CF$_2$=C(CF$_3$)CF$_2$CF$_2$CF$_3$ | 1,1,3,3,4,4,5,5,5-nonafluoro-2-(trifluoromethyl)pent-1-ene |
| HFC-151-12cycym | CF$_2$=CFCF$_2$CF(CF$_3$)$_2$ | 1,1,2,3,3,4,5,5,5-nonafluoro-4-(trifluoromethyl)pent-1-ene |
| HFC-151-12cyyym | CF$_3$CF=CFCF(CF$_3$)$_2$ | 1,1,1,2,3,4,5,5,5-nonafluoro-4-(trifluoromethyl)pent-2-ene |
| HFC-151-12mytm | CF$_3$CF=C(CF$_3$)CF$_2$CF$_3$ | 1,1,1,2,4,4,5,5,5-nonafluoro-3-(trifluoromethyl)pent-2-ene |
| HFC-151-12mmty | (CF$_3$)$_2$C=CFCF$_2$CF$_3$ | 1,1,1,3,4,4,5,5,5-nonafluoro-1-(trifluoromethyl)pent-1-ene |
| HFC-151-12cytmm | CF$_2$=CFC(CF$_3$)$_3$ | 1,1,2,4,4,4-hexafluoro-3,3-bis(trifluoromethyl)but-1-ene |
| HFC-151-12ctmym | CF$_2$=C(CF$_3$)CF(CF$_3$)$_2$ | 1,1,3,4,4,4-hexafluoro-2,3-bis(trifluoromethyl)but-1-ene |
| HFC-151-12cycc | CF$_3$(CF$_2$)$_3$CF=CF$_2$ | 1,1,2,3,3,4,4,5,5,6,6,6-dodecafluorohex-1-ene |
| HFC-151-12mcy | CF$_3$CF$_2$CF=CFCF$_2$CF$_3$ | 1,1,1,2,2,3,4,5,5,6,6,6-dodecafluorohex-3-ene |
| HFC-151-12mmt | (CF$_3$)$_2$C=C(CF$_3$)$_2$ | 1,1,1,4,4,4-hexafluoro-2,3-bis(trifluoromethyl)but-2-ene |
| HFC-153-10czccc | CF$_2$=CHCF$_2$CF$_2$CF$_2$CF$_2$H | 1,1,3,3,4,4,5,5,6,6-decafluorohex-1-ene |
| HFC-153-10eyccc | CHF=CFCF$_2$CF$_2$CF$_2$H | 1,2,3,3,4,4,5,5,6,6-decafluorohex-1-ene |
| HFC-153-10mzycc | CF$_3$CH=CFCF$_2$CF$_2$CF$_2$H | 1,1,1,3,4,4,5,5,6,6-decafluorohex-2-ene |
| HFC-153-10ctmf | CF$_2$=C(CF$_3$)CH$_2$CF$_2$CF$_3$ | 1,1,4,4,5,5,5-heptafluoro-2-(trifluoromethyl)pent-1-ene |
| HFC-153-10mmtyc | (CF$_3$)$_2$C=CFCH$_2$CF$_3$ | 1,1,1,3,5,5,5-heptafluoro-2-(trifluoromethyl)pent-2-ene |
| HFC-153-10mzyz | CF$_3$CH=CFCH(CF$_3$)$_2$ | 1,1,1,3,5,5,5-heptafluoro-4-(trifluoromethyl)pent-2-ene |
| FC-C-1316cc | Cyclo-CF$_2$CF$_2$CF=CF— | hexafluorocyclobutene |
| FC-C-1418y | Cyclo-CF$_2$CF=CFCF$_2$CF$_2$— | octafluorocyclopentene |
| FC-C-151-10y | Cyclo-CF$_2$CF=CFCF$_2$CF$_2$CF$_2$ | decafluorocyclohexane |

The compounds listed in Table 2 are available commercially or may be prepared by processes known in the art or as described herein.

1,1,1,4,4,4-hexafluoro-2-butene ($CF_3CH=CHCF_3$) may be prepared from 1,1,1,4,4,4-hexafluoro-2-iodobutane ($CF_3CHICH_2CF_3$) by reaction with KOH using a phase transfer catalyst at about 60° C. The synthesis of 1,1,1,4,4,4-hexafluoro-2-iodobutane may be carried out by reaction of perfluoromethyl iodide ($CF_3I$) and 3,3,3-trifluoropropene ($CF_3CH=CH_2$) at about 200° C. under autogenous pressure for about 8 hours.

1,1,1,2,3,4-hexafluoro-2-butene ($CF_3CF=CFCH_2F$) may be prepared by dehydrofluorination of 1,1,1,2,3,3,4-heptafluorobutane ($CH_2FCF_2CHFCF_3$) using solid KOH.

1,1,1,2,4,4-hexafluoro-2-butene ($CF_3CF=CHCHF_2$) may be prepared by dehydrofluorination of 1,1,1,2,2,4,4-heptafluorobutane ($CHF_2CH_2CF_2CF_3$) using solid KOH.

1,1,1,3,4,4-hexafluoro-2-butene ($CF_3CH=CFCHF_2$) may be prepared by dehydrofluorination of 1,1,1,3,3,4,4-heptafluorobutane ($CF_3CH_2CF_2CHF_2$) using solid KOH.

Flame suppression compositions of the present disclosure can comprise a single compound as listed, for example, in Table 2, or may comprise a combination of compounds from Table 2 or, alternatively, a combination of compounds from Table 2 and Formula I.

Additionally, many of the compounds in Table 2 may exist as different configurational isomers or stereoisomers. When the specific isomer is not designated, the present disclosure is intended to include all single configurational isomers, single stereoisomers, or any combination thereof. For instance, 1,1,1,2,4,4,5,5,5-nonafluoropent-2-ene is meant to represent the E-isomer, Z-isomer, or any combination or mixture of both isomers in any ratio. Another example is HFC-1336pz, by which is represented the E-isomer, Z-isomer, or any combination or mixture of both isomers in any ratio.

The amount of the fluorocarbons (FC) or hydrofluorocarbons (HFC) contained in the present flame suppression compositions (from, e.g., Formula I, Table 1, or Table 2) can vary widely, depending upon the particular application, and compositions containing more than trace amounts and less than 100% of the compound are within broad the scope of the present disclosure. As will be recognized by those of skill in the art, the amount added will depend, at least in part, on the degree to which the subject fluid is flammable and the degree to which it is desired to reduce the flammability thereof. In certain preferred embodiments, the amount of flame suppression composition added to the flammable fluid is effective to render the resulting fluid non-flammable. Depending on the space or area protected, additional amounts of flame suppression composition may have to be introduced because of leakage or diffusion in order to achieve and maintain the proper final concentration at some stage of the operation.

The present flame suppressants may be solids, liquids, or gases under ambient conditions, but are preferably utilized for the present methods of fire suppression, reduction, extinguishment, or inertion in either liquid or gaseous state (or both). Thus, normally solid compounds are preferably utilized after transformation to liquid and/or gas through melting, sublimation, or dissolution in a liquid co-agent. Such transformation can occur upon exposure of the compound to the heat of a fire.

One aspect provides methods for reducing the flammability of a fluid, said methods comprising adding a flame suppression composition of the present disclosure to said fluid. The flammability associated with any of a wide range of flammable fluids may be reduced according to the present disclosure. For example, the flammability associated with fluids such as ethylene oxide, flammable hydrofluorocarbons, and hydrocarbons including, for example, 1,1-difluoroethane (HFC-152a), 1,1,1-trifluoroethane (HFC-143a), difluoromethane (HFC-32), propane, hexane, octane, and the like can be reduced according to the present disclosure. For the purposes of the present disclosure, a flammable fluid may be any fluid exhibiting flammability ranges in air as measured via any standard conventional test method, such as ASTM E-681, and the like.

A further aspect provides methods of suppressing a flame, said methods comprising contacting a flame with a fluid comprising a flame suppression composition of the present disclosure. Any suitable methods for contacting the flame with the present composition may be used. For example, a flame suppression composition of the present disclosure may be sprayed, poured, and the like onto the flame, or at least a portion of the flame may be immersed in the flame suppression composition. In light of the teachings herein, those of skill in the art will be readily able to adapt a variety of conventional apparatus and methods of flame suppression for use in the present disclosure.

A further embodiment provides methods of extinguishing or suppressing a fire in a total-flood application comprising providing an agent comprising a flame suppression composition of the present disclosure; disposing the agent in a pressurized discharge system; and discharging the agent into an area to extinguish or suppress fires in that area.

Another embodiment provides methods of inerting an area to prevent a fire or explosion comprising providing an agent comprising a flame suppression composition of the present disclosure; disposing the agent in a pressurized discharge system; and discharging the agent into the area to prevent a fire or explosion from occurring.

The term "extinguishment" is usually used to denote complete elimination of a fire; whereas, "suppression" is often used to denote reduction, but not necessarily total elimination, of a fire or explosion. As used herein, terms "extinguishment" and "suppression" will be used interchangeably. There are four general types of halocarbon fire and explosion protection applications. (1) In total-flood fire extinguishment and/or suppression applications, the agent is discharged into an enclosed space to achieve a concentration sufficient to extinguish or suppress an existing fire. This is often, though not always, done by an automatic system, which detects the fire and then automatically discharges the extinguishing agent to fill the space with the concentration of a gaseous or an evaporated volatile liquid agent to the concentration needed to suppress or extinguish the contained fire. Total flooding use includes protection of enclosed, potentially occupied spaces such, as computer rooms as well as specialized, often unoccupied spaces such as aircraft engine nacelles and engine compartments in vehicles. (2) In streaming applications, the agent is applied directly onto a fire or into the region of a fire. This is usually accomplished using manually operated wheeled or portable units. A second method, included as a streaming application, uses a "localized" system, which discharges agent toward a fire from one or more fixed nozzles. Localized systems may be activated either manually or automatically. (3) In explosion suppression, a fluorocarbon or hydrofluorocarbon of the present disclosure is discharged to suppress an explosion that has already been initiated. The term "suppression" is normally used in this application because the explosion is usually self-limiting. However, the use of this term does not necessarily imply that the explosion is not extinguished by the agent. In this application, a detector is usually used to detect an expanding fireball from an explosion, and the agent is discharged rapidly to suppress the explosion. Explosion suppression is used primarily, but not solely, in defense applications. (4) In inertion, a fluorocarbon or hydrofluorocarbon of the present disclosure is discharged into an enclosed space to prevent an explosion or a fire from being initiated. Often, a system similar or identical to that used for total-flood fire extinguishment or suppression is used. Usually, the presence of a dangerous condition (for example, dangerous concentrations of flammable or explosive gases) is detected, and the fluorocarbon or hydrofluorocarbon of the present disclosure is then discharged to prevent the explosion or fire from occurring until the condition can be remedied. In addition, in fire prevention applications for extinguishing agents, the agent is directed to an enclosed area upon detection of a potential hazard, such as a smoldering ember or a fire near to but not within an enclosed area. In these applications, the atmosphere in the enclosed area will not sustain or initiate combustion but remains breathable.

The extinguishing method can be carried out by introducing the composition into an area surrounding a fire. Any of the known methods of introduction can be utilized provided that appropriate quantities of the composition are metered into the enclosed area at appropriate intervals. For example, a composition can be introduced by streaming, e.g., using conventional portable (or fixed) fire extinguishing equipment; by misting; or by total flooding, e.g., by releasing (using appropriate piping, valves, and controls) the composition into an enclosed area surrounding a fire. The composition can optionally be combined with an inert propellant, e.g., nitrogen, argon, decomposition products of glycidyl azide polymers or carbon dioxide, to increase the rate of discharge of the composition from the streaming or flooding equipment utilized.

Preferably, the extinguishing process involves introducing a flame suppressant of the present disclosure to a fire or flame in an amount sufficient to extinguish the fire or flame. One skilled in this field will recognize that the amount of flame suppressant needed to extinguish a particular fire will depend upon the nature and extent of the hazard. When the flame suppressant is to be introduced by total flooding, cup burner test data is useful in determining the amount or concentration of flame suppressant required to extinguish a particular type of fire.

Laboratory tests useful for determining effective concentration ranges of flame suppression compositions when used in conjunction with extinguishing or suppressing a fire in a total-flood application or fire inertion are described, for example, in U.S. Pat. No. 5,759,430, which is hereby incorporated by reference.

The present flame suppressants may be utilized additionally in combination with a propellant (e.g., for expelling a liquid flame suppressant from a sealed vessel), where the propellant can be moderately flammable or flammable, provided that the resultant composition comprising flame suppressant and such propellant is non-flammable.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the method described herein without departing from the concept, spirit, and scope of the present disclosure. More specifically, it will be apparent that certain agents which are chemically related may be substituted for the agents described herein while the same or similar results would be achieved. All such similar substitutes and modifications apparent to those skilled in the art are deemed to be within the spirit, scope, and concept of the present disclosure as defined by the appended claims.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Example 1

Synthesis of
1,1,1,4,4,5,5,6,6,7,7,7-dodecafluorohept-2-ene
(F14E)

Synthesis of $C_4F_9CH_2CHICF_3$

Perfluoro-n-butyliodide (180.1 gm, 0.52 moles) and 3,3,3-trifluoropropene (25.0 gm, 0.26 moles) were added to a 400 ml HasteHoy™ shaker tube and heated to 200° C. for 8 hours under autogenous pressure, which increased to a maximum of 428 PSI. The product was collected at room temperature. The above reaction was carried out again at these conditions and the products combined. It was then repeated doubling the amount of perfluoro-n-butyliodide and 3,3,3-trifluoropropene in the same 400 ml reactor. In this case the pressure increased to 573 PSI. The products of the three reactions were combined and distilled to give 322.4 gm of $C_4F_9CH_2CHICF_3$ (52.2°/35 mm) in 70% yield.

Conversion of $C_4F_9CH_2CHICF_3$ to F14E $C_4F_9CH_2CHICF_3$ (322.4 gm, 0.73 moles) was added dropwise via addition funnel to a 2 L round bottom flask equipped with stir a bar and connected to a packed distillation column and still head. The flask contained isopropyl alcohol (95 ml), KOH (303.7 gm, 0.54 moles) and water (303 ml). Product was collected, washed with sodium metabisulfite, water, dried with $MgSO_4$ and distilled through a 6" column filled with glass helices. The product, F14E (173.4 gm, 76%) boils at 78.2° C. It was characterized by $^{19}F$ NMR (δ −66.7 ($CF_3$, m, 3F), −81.7 ($CF_3$, m 3F), −124.8 ($CF_2$, m, 2F), −126.4 ($CF_2$, m, 2F), and −114.9 ppm ($CF_2$, m, 2F))$^1H$ NMR (δ 6.45) in chloroform-d solution.

Example 2

Synthesis of 1,1,1,2,2,5,5,6,6,7,7,8,8,8-tetradecafluorooct-3-ene (F24E)

Synthesis of $C_4F_9CHICH_2C_2F_5$

Perfluoroethyliodide (220 gm, 0.895 mole) and 3,3,4,4,5,5,6,6,6-nonafluorohex-1-ene (123 gm, 0.50 mole) were added to a 400 ml Hastelloy™ shaker tube and heated to 200° C. for 10 hours under autogenous pressure. The product from this and two others carried out under similar conditions were combined and washed with two 200 mL portions of 10 wt % aqueous sodium bisulfite. The organic phase was dried over calcium chloride and then distilled to give 277.4 gm of $C_4F_9CH_2CHICF_3$ (79-81° C./67-68 mm Hg) in 37% yield.

Conversion of $C_4F_9CHICH_2C_2F_5$ to F24E

A 1 L round bottom flask equipped with a mechanical stirrer, addition funnel, condenser, and thermocouple was charged with $C_4F_9CHICH_2C_2F_5$ (277.4 gm, 0.56 moles) and isopropanol (217.8 g). The addition funnel was charged with a solution of potassium hydroxide (74.5 g, 1.13 moles) dissolved in 83.8 g of water. The KOH solution was added dropwise to the flask with rapid stirring over the course of about one hour as the temperature slowly increased from 21° C. to 42° C. The reaction mass was diluted with water and the product recovered by phase separation. The product was washed with 50 mL portions of 10 wt % aqueous sodium bisulfite and water, dried over calcium chloride, and then distilled at atmospheric pressure. The product, F24E (128.7 gm, 63%) boils at 95.5° C. It was characterized by $^{19}F$ NMR ($\delta$ −81.6 ($CF_3$, m, 3F), −85.4 ($CF_3$, m 3F), −114.7 ($CF_2$, m, 2F), −118.1 ($CF_2$, m, 2F), −124.8 ppm ($CF_2$, m, 2F), −126.3 ppm ($CF_2$, m, 2F)) and $^1H$ NMR (6.48) in chloroform-d solution.

Example 3

Synthesis of $CF_3CH=CHCF(CF_3)_2$

Synthesis of $CF_3CHICH_2CF(CF_3)_2$ $(CF_3)_2CFI$ (265 gm, 0.9 moles) and 3,3,3-trifluoropropene (44.0 gm, 0.45 moles) were added to a 400 ml Hastelloy™ shaker tube and heated to 200° C. for 8 hours under autogenous pressure, which increased to a maximum of 585 psi. The product was collected at room temperature to give 110 gm of $(CF_3)_2CFCH_2CHICF_3$ (76-77° C./200 mm) in 62% yield.

Conversion of $(CF_3)_2CFCH_2CHICF_3$ to F131E $(CF_3)_2CFCH_2CHICF_3$ (109 gm, 0.28 moles) was slowly added dropwise via addition funnel to a 500 ml round bottom flask heated to 42° C. equipped with stir a bar and connected to a short path distillation column and dry ice trap. The flask contained isopropyl alcohol (50 ml), KOH (109 gm, 1.96 moles) and water (109 ml). During the addition, the temperature increased from 42 to 55° C. After refluxing for 30 minutes, the temperature in the flask increased to 62° C. Product was collected, washed with water, dried with $MgSO_4$ and distilled. The product, F131E (41 gm, 55%), boils at 48-50° C. and was characterized by $^{19}F$ NMR ($\delta$ −187.6 (CF, m 1F), −77.1 ($CF_3$, m 6F), −66.3 ($CF_3$, m 3F) in chloroform-d solution.

Example 4

Fire Extinguishing Concentration

The fire extinguishing concentrations of F14E, PFBE, F11E and F12E were determined by the ICI Cup Burner method; results are shown in Table 3. This method is described in "Measurement of Flame-Extinguishing Concentrations" R. Hirst and K. Booth, Fire Technology, vol. 13(4):296-315 (1977).

Specifically, an air stream is passed at 40 liters/minute through an outer chimney (8.5 cm, I.D. by 53 cm tall) from a glass bead distributor at its base. A fuel cup burner (3.1 cm O.D. and 2.15 I.D.) is positioned within the chimney at 30.5 cm below the top edge of the chimney. The fire extinguishing agent is added to the air stream prior to its entry into the glass bead distributor while the air flow rate is maintained at 40 liters/minute for all tests. The air and agent flow rates are measured using calibrated rotameters.

The test is conducted by adjusting the fuel (n-heptane) level in the reservoir to bring the liquid fuel level in the cup burner just even with the ground glass lip on the burner cup. With the air flow rate maintained at 40 liters/minute, the fuel in the cup burner is ignited. The fire extinguishing agent is added in measured increments until the flame is extinguished.

The fire extinguishing concentration is determined from the following equation:

Extinguishing concentration=$(F1/(F1+F2))\times 100$ where F1 is the agent flow rate and F2 is the air flow rate.

TABLE 3

| FIRE EXTINGUISHING AGENT | FIRE EXTINGUISHING CONCENTRATION (vol % in air) |
| --- | --- |
| $CF_3CF_2CF_2CF_2CH=CH_2$ (PFBE) | 5.3% |
| $CF_3CH=CHCF_2CF_2CF_2CF_3$ (F14E) | 4.7% |
| $CF_3CH=CHCF_2CF_3$ (F12E) | 6.0% |
| $CF_3CH=CHCF_3$ (F11E) | 5.6% |
| COMPARATIVE | |
| $CF_3CHFCF_3$ (HFC-227ea) | 7.3% |
| $CF_3CHFCHF_2$ (HFC-236ea) | 10.2% |
| $CF_3CF_2CH_2Cl$ (HCFC-235cb) | 6.2% |
| $CF_4$ | 20.5% |
| $C_2F_6$ | 8.7% |
| $CF_3Br$ (Halon1301) | 4.2% |
| $CF_2ClBr$ (Halon1211) | 6.2% |
| $CHF_2Cl$ | 13.6% |

Example 5

Toxicity Study of F12E

Toxicity studies were conducted on F12E. Acute lethality was evaluated with rats by exposure to F12E vapors for 4 hours and observation over a 14-day recovery period. The 4 hour ALC was found to be greater than 8,210 ppm, indicating that F12E is of low acute toxicity.

Genetic toxicity was determined by Ames test using *Salmonella typhimurium* strains TA100, TA1535, TA97a and TA98; and *Escherichia coli* strain WP2 uvrA(PKM101) exposed to the fluorocarbon compounds in the presence and absence of a metabolic activation system. F12E was found to give a negative result in the Ames test, i.e., it did not exhibit genetic toxicity. Results for F12E are summarized in Table 4.

TABLE 4

| Toxicity Testing of F12E | |
| --- | --- |
| Test | Results |
| Acute lethality | 4-hr ALC > 8,210 ppm |
| Ames Test | Negative (passed) |

The foregoing written description is only exemplary of the invention, whose limitations are to be found solely in the following claims.

We claim:

1. A method of suppressing a flame comprising contacting the flame with a flame suppression composition comprising (ii) $CHF=CHCF(CF_3)_2$.

2. The method of suppressing a flame according to claim 1, wherein said flame suppressant composition further comprises a propellant.

3. A method of extinguishing or suppressing a fire in a total-flood or streaming application comprising:
(a) providing an agent comprising a flame suppression composition;
(b) disposing the agent in a pressurized discharge system; and,
(c) discharging the agent into an area to extinguish or suppress fires in that area,
wherein said flame suppression composition comprises
(ii) $CHF = CHCF(CF_3)_2$.

4. A method of inerting an area to prevent a fire or explosion comprising:
(a) providing an agent comprising a flame suppression composition;
(b) disposing the agent in a pressurized discharge system; and,
(c) discharging the agent into the area to prevent a fire or explosion from occurring,
wherein said flame suppression composition comprises
(ii) $CHF = CHCF(CF_3)_2$.

5. A method of preventing a fire in an enclosed area, comprising:
(a) detecting a potential fire or ignition source; and,
(b) discharging an agent comprising a flame suppression composition into the enclosed area thereby preventing the fire,
wherein the resultant atmosphere within the enclosed area will not sustain or initiate combustion but remains breathable, and
wherein said flame suppression composition comprises
(ii) $CHF = CHCF(CF_3)_2$.

* * * * *